Feb. 13, 1940. C. E. LUNDBLAD 2,189,957
MEAT TENDERER
Filed Oct. 5, 1938    2 Sheets-Sheet 1
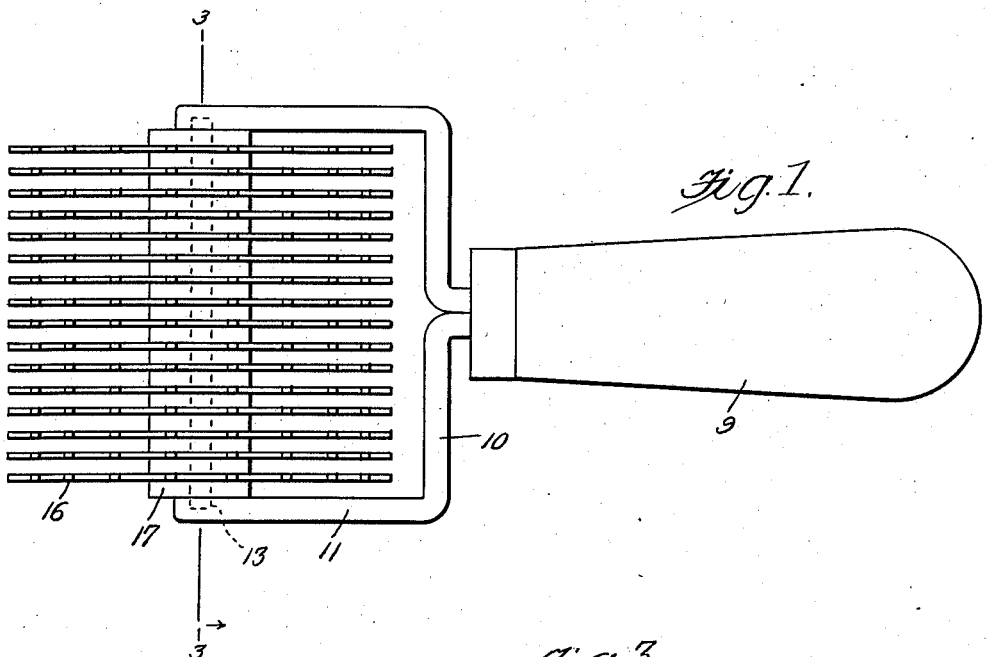
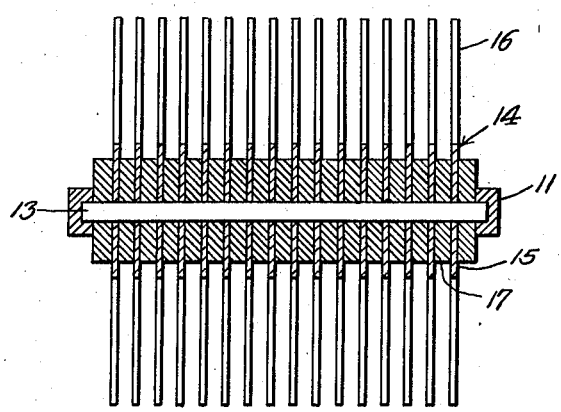
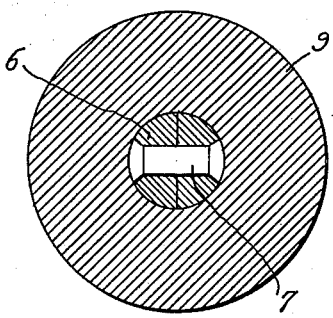
Inventor
Carl E. Lundblad.
By Clarence A. O'Brien
and Hyman Berman
Attorneys Feb. 13, 1940.　　　C. E. LUNDBLAD　　　2,189,957
MEAT TENDERER
Filed Oct. 5, 1938　　　2 Sheets-Sheet 2

Inventor
Carl E. Lundblad,

By Clarence A. O'Brien
and Hyman Berman
Attorneys

Patented Feb. 13, 1940

2,189,957

UNITED STATES PATENT OFFICE 2,189,957

MEAT TENDERER

Carl E. Lundblad, St. Paul, Minn.

Application October 5, 1938, Serial No. 233,511

1 Claim. (Cl. 17—29)

The present invention relates to meat tenderers and has for its primary object to provide a device of this character involving a plurality of prongs extending radially from a shaft and suitably mounted on a handle for rolling the same over tough steak for the purpose of making indentations in the meat in order that the heat and the frying medium may enter the meat to facilitate the cooking of the interior thereof without the application of an excessive amount of heat.

One of the important objects of the present invention is to provide a novel support for the rotatably mounted prongs and to which support the handle is attached.

Another object is to provide a device of this character of simple and practical construction, which is efficient and reliable in performance, relatively inexpensive to manufacture and otherwise well adapted for the purposes for which the same is intended.

Other objects and advantages reside in the details of construction as more fully hereinafter described and claimed, reference being had to the accompanying drawings forming part hereof, wherein like numerals refer to like parts throughout, and in which—

Figure 1 is a top plan view.

Figure 3 is a transverse sectional view taken substantially on a line 3—3 of Fig. 1.

Figure 5 is an enlarged sectional view through the handle, taken substantially on a line 5—5 of Fig. 2.

Figure 2:
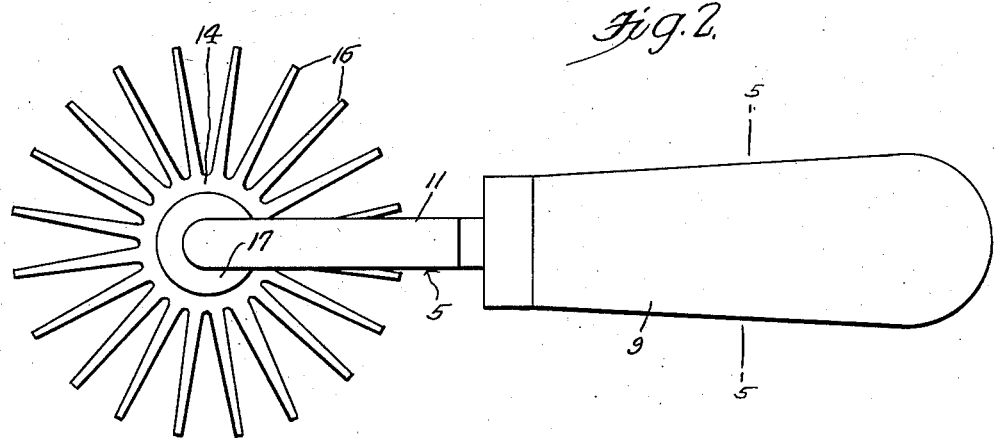
Figure 2 is a side elevational view.
Figure 4:
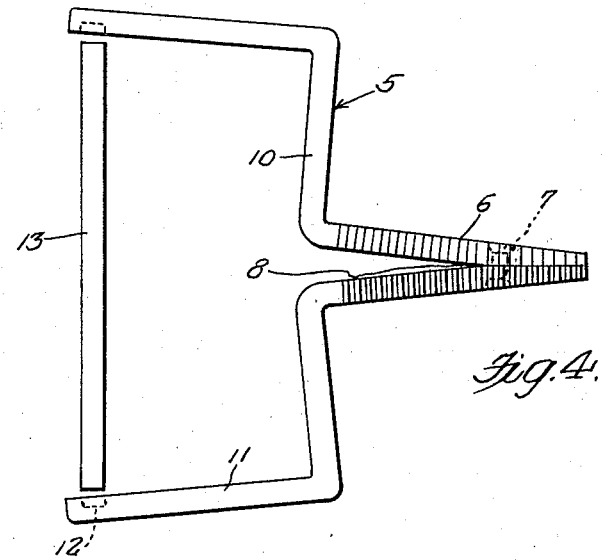
Figure 4 is a top plan view of the support for the prongs.
Figure 6:
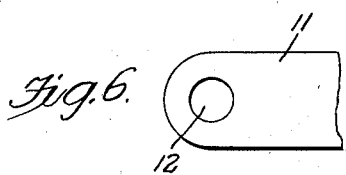
Figure 6 is a detail of the outer end of one of the shaft supporting arms.

Referring now to the drawings in detail wherein for the purpose of illustration I have disclosed a preferred embodiment of the invention, the numeral 5 designates a supporting yoke generally, said yoke being formed of a pair of duplicate members, each of said members including a segment 6 of a longitudinally split threaded stem, the segments being positioned with flat surfaces in abutting relation and secured to each other adjacent one end by a loose-fitting rivet or the like 7 to connect the segments of the stem for threading into a handle 9, the rivet having the necessary freedom to enable the opening and closing movement of the outer ends of the yoke for the purpose hereinafter explained. The flattened surfaces of the segments at their ends outwardly from the rivet diverge, as at 8, to facilitate spreading apart of the ends of the yoke.

Both of the members 5 at the free end of the segments 6 are bent substantially at right angles in opposite directions as shown at 10, for positioning crosswise of the adjacent end of the handle, and the extremities of each of the members are bent at right angles in parallelism as shown at 11 and provided in their opposed faces, adjacent their free ends, with pockets or recesses 12 for rotatably receiving the ends of a shaft 13, the shaft being held in engaged position in the recesses by reason of the contraction of the end portions 11 when the stem is inserted in the handle in a manner as will be apparent.

Freely mounted on the shaft 13 is a plurality of tendering elements designated generally at 14, each of which includes a hub portion 15 and a plurality of radially extending prongs 16. The prongs are maintained in spaced relation by means of spacing discs 17 mounted on the shaft and are free to rotate independently of each other.

With the parts secured in position as shown in Figs. 1, 2, and 3 the movement of the prongs along the surface of the meat will cause the rotation of the prongs upon the shaft whereby to cause the entire surface of the meat to be perforated.

It is believed the details of construction and manner of use of the device will be readily understood from the foregoing without further detailed explanation.

What is claimed is:

A meat tenderer comprising a shaft support formed of a pair of duplicate members, each member including the segment of a longitudinally split stem, a rivet loosely securing one end of each of the segments flatwise to the corresponding end of the other, a handle threadedly receiving the segments, the free ends of the segments at their abutting surfaces diverging, spaced parallel extensions on the members having shaft-accommodating sockets therein and adapted to clamp the ends of the shaft between the extensions, and a plurality of tendering members rotatably mounted on the shaft.

CARL E. LUNDBLAD.